United States Patent
Nakano et al.

(10) Patent No.: US 8,460,573 B2
(45) Date of Patent: Jun. 11, 2013

(54) METHOD FOR PRODUCING CATHODE ACTIVE MATERIAL FOR LITHIUM ION BATTERIES, CATHODE ACTIVE MATERIAL FOR LITHIUM ION BATTERIES OBTAINED BY THE PRODUCTION METHOD, LITHIUM ION BATTERY ELECTRODE, AND LITHIUM ION BATTERY

(75) Inventors: Masatsugu Nakano, Chiyda-ku (JP); Mitsumasa Saitou, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 180 days.

(21) Appl. No.: 12/988,958

(22) PCT Filed: Apr. 20, 2009

(86) PCT No.: PCT/JP2009/057853
§ 371 (c)(1),
(2), (4) Date: Oct. 21, 2010

(87) PCT Pub. No.: WO2009/131095
PCT Pub. Date: Oct. 29, 2009

(65) Prior Publication Data
US 2011/0037019 A1    Feb. 17, 2011

(30) Foreign Application Priority Data
Apr. 25, 2008    (JP) ................... 2008-115982

(51) Int. Cl.
*H01M 4/88*    (2006.01)
(52) U.S. Cl.
USPC .......... 252/182.1; 252/500; 252/506; 29/623; 429/218.1; 429/221; 429/223; 429/306; 429/331

(58) Field of Classification Search
USPC ..... 252/182.1, 500, 506; 423/306; 429/218.1, 429/221, 306, 231.9, 223, 331; 29/623.5, 29/623
See application file for complete search history.

(56) References Cited

U.S. PATENT DOCUMENTS 7,390,473 B1 *    6/2008   Singhal et al. ............... 423/306
2007/0054187 A1 *    3/2007   Nuspl et al. ............... 429/218.1

(Continued)

FOREIGN PATENT DOCUMENTS

EP    1094532 A1 *   4/2001
JP    3484003         1/2004

(Continued)

OTHER PUBLICATIONS

Padhi et al. "Phospho-olivines as Positive-Electrode Materials for Rechargeable Lithium Batteries." *J. Electrochem.Soc.* vol. 144. No. 4. 1997. pp. 1188-1194.

(Continued)

*Primary Examiner* — Khanh Tuan Nguyen
(74) *Attorney, Agent, or Firm* — Merchant & Gould P.C.

(57) ABSTRACT

A method for producing a cathode active material for lithium ion batteries includes a step of synthesizing $LiFePO_4$ by carrying out a hydrothermal reaction using an Li salt, a Fe salt, and a phosphoric acid source as raw materials. Elements Li and Fe in the Li and Fe salts are added to the reaction system in amounts excessively larger than the theoretical amounts required for the hydrothermal reaction. The synthesized $LiFePO_4$ has an average primary particle size of equal to or larger than 30 nm and equal to or smaller than 100 nm.

3 Claims, 3 Drawing Sheets

U.S. PATENT DOCUMENTS

| | | | |
|---|---|---|---|
| 2007/0207080 A1* | 9/2007 | Yang | 423/306 |
| 2008/0032195 A1* | 2/2008 | Atsumi et al. | 429/221 |
| 2009/0155689 A1* | 6/2009 | Zaghib et al. | 429/221 |
| 2010/0237275 A1* | 9/2010 | Park et al. | 252/182.1 |

FOREIGN PATENT DOCUMENTS

| | | |
|---|---|---|
| JP | T-2004-509447 | 3/2004 |
| JP | 2008-117749 | 5/2005 |
| JP | 2007-103298 | 4/2007 |
| JP | 2007-511458 | 5/2007 |
| JP | 3484003 | 10/2007 |
| JP | 2008-66019 | 2/2008 |
| JP | 2008-66019 | 3/2008 |
| JP | 2008-117749 | 5/2008 |
| JP | 2008-130526 | 6/2008 |
| WO | WO 02/27823 A1 | 4/2002 |
| WO | WO 2008/023908 * | 2/2008 |

OTHER PUBLICATIONS

Shiraishi et al. "Synthesis of LifePO$_4$ Cathode Active Material for Rechargeable Lithium Batteries by Hydrothermal Reaction." *J. of the Ceramic Soc. of Japan. Supp.* 112-1, PacRim5 Special Issue. vol. 12. No. 5. 2004. pp. S58-S62.

* cited by examiner

METHOD FOR PRODUCING CATHODE ACTIVE MATERIAL FOR LITHIUM ION BATTERIES, CATHODE ACTIVE MATERIAL FOR LITHIUM ION BATTERIES OBTAINED BY THE PRODUCTION METHOD, LITHIUM ION BATTERY ELECTRODE, AND LITHIUM ION BATTERY

This application is a National Stage Application of PCT/JP2009/057853, filed 20 Apr. 2009, which claims benefit of Serial No. 2008-115982, filed 25 Apr. 2008 in Japan and which applications are incorporated herein by reference. To the extent appropriate, a claim of priority is made to each of the above disclosed applications.

TECHNICAL FIELD

The present invention relates to a method for producing a cathode active material for lithium ion batteries, a cathode active material for lithium ion batteries produced by the same, a lithium ion battery electrode, and a lithium ion battery. More specifically, the present invention relates to a method for producing a cathode active material for lithium ion batteries capable of controlling an average primary particle system, a cathode active material for lithium ion batteries having a uniform average primary particle size produced by the same, a lithium ion battery electrode capable of improving discharge capacity, and a lithium ion battery.

BACKGROUND ART

Nonaqueous lithium ion batteries have a high energy density compared to conventional aqueous batteries such as Ni—Cd and Ni—H batteries, and can be manufactured in a small size. Therefore, such batteries are widely used in portable devices such as cellular phones and PCs. Moreover, $LiCoO_2$ is generally used as the cathode material of lithium ion batteries which are presently being popularized.

However, several problems have been raised regarding the direct application of $LiCoO_2$ to large batteries used in hybrid vehicles, electric vehicles, and uninterruptible power systems which are expected in the future.

For example, one of the problems raised concerns resources and costs. Since $LiCoO_2$ uses cobalt (Co) which is a rare metal, the use of a large amount of cobalt may cause resource and cost problems.

Moreover, another problem raised is about the danger of explosion. Since $LiCoO_2$ releases oxygen at high temperatures, abnormal heating or short-circuiting of batteries may lead to the danger of explosion. Therefore, it is highly risky to apply $LiCoO_2$ to large batteries.

In this regard, as a substitute for the cathode materials that use $LiCoO_2$, cathode materials which are cheap and less dangerous and which have a phosphate skeleton have been proposed recently. Among them, $LiFePO_4$ having an olivine structure as disclosed in Patent Citation 1 and Non-Patent Citation 1 is attracting worldwide attention as a material satisfying the resource, cost, and safety requirements.

Olivine-based cathode materials expressed by a composition such as $LiFePO_4$ use iron (Fe) as is clear from the composition, and from the resource perspective, iron is abundant in the natural world and cheap compared to cobalt and manganese-based cathode materials. Moreover, since the olivine-based cathode materials have a covalent bond of phosphorous and oxygen, such materials will not release oxygen at high temperatures unlike cobalt-based cathode materials and can be said to be materials having excellent safety properties.

However, although $LiFePO_4$ has the above-mentioned advantages, concerns have been raised about its properties. One problem is low conductivity. However, many reports show that the low conductivity has been solved by recent improvements, particularly by preparing a composite with carbon or coating the surface with carbon.

Another problem is low diffusibility of lithium ions during charge and discharge. In compounds having a layered structure as in $LiCoO_2$ and a spinel structure as in $LiMnO_2$, the diffusion of lithium during charge and discharge takes place in two or three directions. In contrast, in an olivine structure of $LiFePO_4$, the diffusion of lithium takes place in only one direction. In addition, since an electrode reaction during charge and discharge is a 2-phase reaction in which conversion between $LiFePO_4$ and $FePO_4$ occurs repeatedly, $LiFePO_4$ has been considered to be disadvantageous for quick charge and discharge.

A method of reducing the particle size of $LiFePO_4$ particles is considered as the most effective countermeasure.

It is considered to be able to cope with quick charge and discharge if a diffusion distance is decreased by the reduced particle size even when the diffusion takes place in only one direction.

The simplest $LiFePO_4$ synthesis method is a method called a solid-phase method. Briefly, this method is a method of mixing Li, Fe, and P sources in stoichiometric proportions and baking the mixture in an inert atmosphere. This method has a problem in that unless the baking conditions are chosen suitably, it is unable to obtain a resulting material having an intended composition and it is difficult to control a particle size.

Moreover, research has also been made on liquid-phase synthesis using a hydrothermal reaction.

An advantage of the hydrothermal reaction is the ability to obtain a resulting material having a high purity at a temperature which is far lower than a solid-phase reaction. However, in the case of the hydrothermal reaction, particle size control relies greatly on preparation conditions such as a reaction temperature and time. Moreover, even when the particle size is controlled under these preparation conditions, the particle size is often influenced by the performance of a manufacturing apparatus itself, and there is a difficulty in reproducibility.

A means for reducing the particle size through reaction control in the hydrothermal synthesis of $LiFePO_4$-based materials is disclosed in Patent Citation 2 and Non-Patent Citation 2, for example. A method of carrying out a reaction by adding organic acids and ions such as $CH_3COO^-$, $SO_4^{2-}$, or $Cl^-$ to a solvent at the same time and adding an excess of Li to this reaction, thus obtaining single-phase $LiFePO_4$ microparticles is proposed in Patent Citation 2 and Non-Patent Citation 2.

Moreover, an attempt to obtain $LiFePO_4$ having a small particle size by mechanically grinding a reaction intermediate is disclosed in Patent Citation 3.

Patent Citation 1: JP-B-3484003
Patent Citation 2: JP-A-2008-66019
Patent Citation 3: JP-T-2007-511458
Non-Patent Citation 1: A. K. Padhi et al., J. Electrochem. Soc., 144, 4, 1188 (1997)
Non-Patent Citation 2: Keisuke Shiraishi et al., Journal of the Ceramic Society of Japan, 112, 1305, S58 (2004)

DISCLOSURE OF INVENTION

Problems to be Solved by the Invention

However, the methods of reducing the particle size of $LiFePO_4$ disclosed in Patent Citation 2 and Non-Patent Citation 2 have to add additional components other than the raw materials, thus complicating separation of impurities after reaction is carried out. Therefore, these methods are not suitable for industrialization of mass production.

Moreover, Patent Citation 3 does not suggest the details of relation between the primary particle size and the battery performance.

The present invention has been made in view of the above-mentioned situation, and an object thereof is to provide a method for producing a cathode active material for lithium ion batteries capable of reducing the particle size of $LiFePO_4$ and enabling simple control of the particle size of $LiFePO_4$.

Means to Solve the Problems

The present inventors clarified the production mechanism of $LiFePO_4$ in a hydrothermal reaction system and attempted to reduce the particle size of $LiFePO_4$.

It was thought that a crystal particle size can be reduced and controlled by adding elements Li and Fe in Li and Fe salts, which are used as raw materials, in amounts excessively larger than the theoretical amounts required for a hydrothermal reaction when $LiFePO_4$ is synthesized.

When $LiFePO_4$ is used as a cathode active material for lithium ion batteries, as described above, the particle size affects charge and discharge properties.

The present inventors have made intensive investigations based on these ideas, and as a result, have found that the crystal particle size of the obtained $LiFePO_4$ can be reduced and controlled by adjusting the amount of the added elements Li and Fe to element P, thus achieving the present invention.

That is, a method for producing a cathode active material for lithium ion batteries of the present invention includes at least a step of carrying out a hydrothermal reaction to produce $LiFePO_4$ by adding elements Li and Fe in Li and Fe salts, which are used as raw materials, in amounts excessively larger than the theoretical amounts required for the hydrothermal reaction, thus synthesizing $LiFePO_4$ which has an average primary particle size of equal to or larger than 30 nm and equal to or smaller than 100 nm.

In this specification, it is assumed that lithium hydroxide is included as the Li salt.

Moreover, the present invention can be paraphrased as follows.

That is, the present invention is a method for producing a cathode active material for lithium ion batteries, including: a step of carrying out a hydrothermal reaction using an Li salt, a Fe salt, and a phosphoric acid source as raw materials to synthesize $LiFePO_4$, wherein elements Li and Fe in the Li and Fe salts are added to the reaction system in amounts excessively larger than the theoretical amounts required for the hydrothermal reaction, and an average primary particle size of the synthesized $LiFePO_4$ is equal to or larger than 30 nm and equal to or smaller than 100 nm.

It is preferable that the Fe salt be added so that the molar ratio of Fe to P is equal to or larger than 1.01, and that the Li salt be added so that the molar ratio of Li to P is equal to or larger than 3.1.

It is preferable that the Li salt be one, or two or more kinds of materials selected from the group consisting of chloride, sulfate, formate, acetate, citrate, and oxalate.

It is preferable that the Fe salt be one, or two or more kinds of materials selected from the group consisting of chloride, sulfate, formate, acetate, citrate, and oxalate.

A cathode active material for lithium ion batteries of the present invention is obtained by the method for producing a cathode active material for lithium ion batteries of the present invention.

A lithium ion battery electrode of the present invention is obtained by coating the cathode active material for lithium ion batteries of the present invention with carbon.

A lithium ion battery of the present invention has the lithium ion battery electrode of the present invention as a cathode.

Effect of the Invention

According to the method for producing a cathode active material for lithium ion batteries of the present invention, Li and Fe will not become deficient in each reaction of the $LiFePO_4$ synthesis.

Therefore, a slowdown in reaction rate and epitaxial growth on fine crystal particles produced in the initial stage of a reaction can be suppressed. Accordingly, it is possible to reduce an average primary particle size and synthesize $LiFePO_4$ having a small particle size with a uniform particle size distribution. Further, by changing the proportion of the added Li and Fe salts in the raw materials, it is possible to control the particle size of $LiFePO_4$.

BEST MODE FOR CARRYING OUT THE INVENTION

Figure 1:
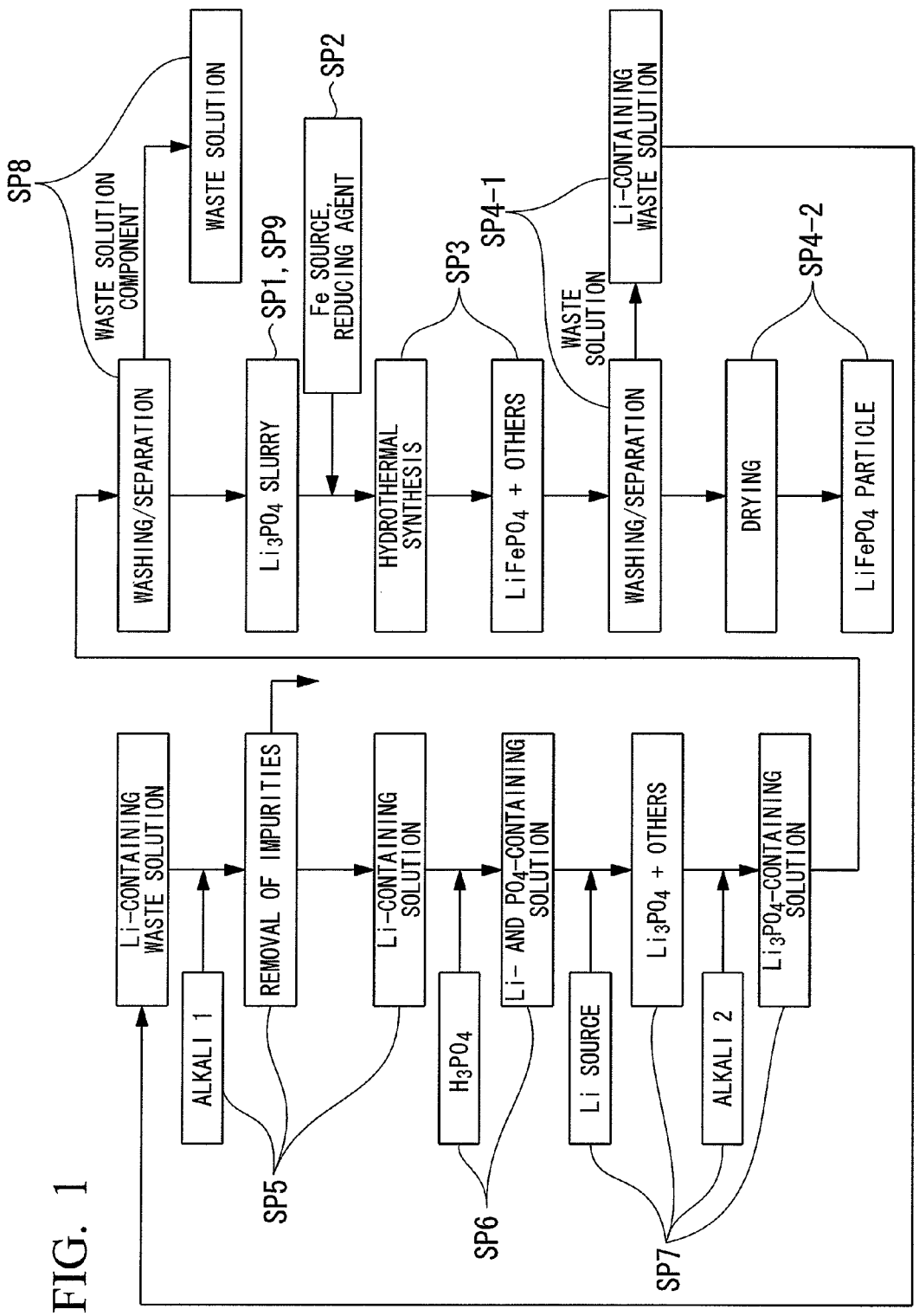
FIG. 1 is a flowchart showing a method for producing a cathode active material for lithium ion batteries of the present invention.

A description will now be given of the best mode for implementing a method for producing a cathode active material for lithium ion batteries, a cathode active material for lithium ion batteries, a lithium ion battery electrode, and a lithium ion battery of the present invention.

This mode is described in detail in order to facilitate understanding of the intent of the present invention, and does not limit the present invention unless there is a particular designation to that effect.

(Production Method of Cathode Active Material for Lithium Ion Batteries)

A method for producing a cathode active material for lithium ion batteries of the present invention includes first to ninth steps.

A first step (SP1) is a step of adding a Li source and a phosphoric acid source to a solvent to cause a reaction to produce lithium phosphate ($Li_3PO_4$) and obtaining lithium phosphate ($Li_3PO_4$) slurry.

A second step (SP2) is a step of mixing a Fe source and a reducing agent to the $Li_3PO_4$ slurry to obtain a mixture.

A third step (SP3) is a step of carrying out a reaction (hydrothermal synthesis) using the mixture obtained in the second step under high-temperature and high-pressure conditions to obtain a reactant including $LiFePO_4$.

A fourth step (SP4-1) is a step of washing and filtrating the reactant including $LiFePO_4$ obtained in the third step to be separated into LiFePO$_4$ and Li-containing waste solution (solution containing unreacted Li).

A fourth step (SP4-2) is a step of drying LiFePO$_4$ separated in the fourth step (SP4-1) and subjecting the dried LiFePO$_4$ to grinding or the like, thus obtaining LiFePO$_4$ particles having an average primary particle size of equal to or larger than 30 nm and equal to or smaller than 100 nm.

A fifth step (SP5) is a step of removing impurities such as Fe and PO$_4$ components from the Li-containing waste solution separated in the fourth step (SP4-1) to obtain a Li-containing solution.

A sixth step (SP6) is a step of adding phosphoric acid to the Li-containing solution obtained in the fifth step to obtain a Li- and PO$_4$-containing solution.

A seventh step (SP7) is a step of producing a solution containing lithium phosphate (Li$_3$PO$_4$) from the Li- and PO$_4$-containing solution obtained in the sixth step.

An eighth step (SP8) is a step of washing and separating lithium phosphate (Li$_3$PO$_4$) from the solution containing lithium phosphate (Li$_3$PO$_4$) obtained in the seventh step.

A ninth step (SP9) is a step of obtaining lithium phosphate slurry from the solution containing lithium phosphate Li$_3$PO$_4$ produced in the eighth step.

In the present invention, when a general expression LiFePO$_4$ is produced by a hydrothermal reaction, elements Li and Fe in the Li and Fe salts which are used as raw materials in the first and second steps are added in amounts excessively larger than the theoretical amounts required for the reaction so as to synthesize LiFePO$_4$ having an average primary particle size of equal to or larger than 30 nm and equal to or smaller than 100 nm.

When LiFePO$_4$ is synthesized by a hydrothermal reaction, there is a method of using synthetic raw materials for Li, Fe(II), and PO$_4$ salts or a method of using Li$_3$PO$_4$ and Fe$_3$(PO$_4$)$_2$ in which element Li or Fe is added to element P.

However, since Fe$_3$(PO$_4$)$_2$ is vulnerable to oxidation and hard to handle, it is preferable to use Li$_3$PO$_4$ and a Fe (II) salt as raw materials.

Moreover, since Li$_3$PO$_4$ is produced in the initial stage of a reaction even when the L$_1$ and PO$_4$ salts are added as separate salts, the same effects are obtained as the case of using Li$_3$PO$_4$ as raw material. Therefore, it is preferable to use Li$_3$PO$_4$ as raw material from the beginning.

The present inventors have investigated a reaction pathway of this hydrothermal reaction system, and as a result, have found that it will be a reaction pathway as shown in Chemical Formula 1 below.

[Chemical Formula 1]

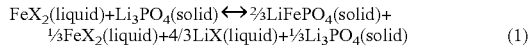

$$FeX_2(liquid) + Li_3PO_4(solid) \leftrightarrow \tfrac{2}{3} LiFePO_4(solid) + \tfrac{1}{3}FeX_2(liquid) + 4/3 LiX(liquid) + \tfrac{1}{3}Li_3PO_4(solid) \quad (1)$$

The reaction shown in Chemical Formula 1 can be broadly divided into two stages. It can be understood that the first stage reaction involves production of Fe$_3$(PO$_4$)$_2$ as shown in Chemical Formula 2 below, and the second stage reaction involves production of LiFePO$_4$ as shown in Chemical Formula 3 below.

[Chemical Formula 2]

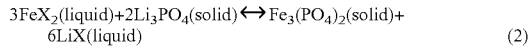

$$3FeX_2(liquid) + 2Li_3PO_4(solid) \leftrightarrow Fe_3(PO_4)_2(solid) + 6LiX(liquid) \quad (2)$$

[Chemical Formula 3]

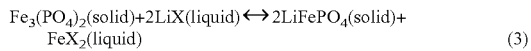

$$Fe_3(PO_4)_2(solid) + 2LiX(liquid) \leftrightarrow 2LiFePO_4(solid) + FeX_2(liquid) \quad (3)$$

That is, in a hydrothermal synthesis, it is thought that if the raw material ratio is set to the theoretical composition value, the percentage of reaction will not reach 100% and in addition, the reaction rate decreases, whereby epitaxial growth on fine crystal particles produced in the initial stage of a reaction is accelerated, and as a result, coarse particles are produced.

In order to accelerate the reaction, it is necessary to add an excess of the Fe salt in order to accelerate the first stage reaction shown in Chemical Formula 2. Moreover, it is necessary to add an excess of the Li salt in order to accelerate the second stage reaction shown in Chemical Formula 3.

Moreover, it was found that since the Fe and Li salts added in excess have different functions, the suitable additive amounts thereof are different.

The present invention has been made based on the above-mentioned idea. Hereinafter, the respective steps will be described in detail with reference to FIG. 1.

<First Step>

First, a Li source and a phosphoric acid source are added to a solvent mainly composed of water to cause a reaction of these Li and phosphoric acid sources to produce lithium phosphate (Li$_3$PO$_4$), and lithium phosphate (Li$_3$PO$_4$) slurry is obtained (SP1 in FIG. 1)

As the Li source, a Li salt is preferred, and for example, one, or two or more kinds of materials selected from the group consisting of lithium hydroxide (LiOH); inorganic acid lithium salts such as lithium carbonate (Li$_2$CO$_3$), lithium chloride (LiCl), lithium sulfate (Li$_2$SO$_4$), or lithium phosphate (Li$_3$PO$_4$); organic acid lithium salts such as lithium formate (HCOOLi), lithium acetate (CH$_3$COOLi), lithium citrate (Li$_3$(C$_6$H$_5$O$_7$)), or lithium oxalate ((COOLi)$_2$); and hydrides of these inorganic acid lithium salts and organic acid lithium salts are preferably used. In this specification, lithium hydride is also included as the Li salt.

The Li salt is preferably added in a molar equivalent of equal to or larger than 3.1 in terms of the element ratio of Li to P. Since the Li salt first reacts with phosphoric acid to produce Li$_3$PO$_4$, 3 molar equivalents thereof will be consumed. Therefore, an excess of Li is required in order to accelerate the second stage reaction shown in Chemical Formula 3. Although the upper limit can be appropriately adjusted in accordance with a reaction rate and an intended particle size, it is not possible to observe a change in particle size of the produced LiFePO$_4$ with a molar equivalent of 4.0 or more. This is supposed to be due to the saturated reaction rate. Therefore, the additive amount of the Li salt is preferably equal to or larger than 3.1 and equal to smaller than 4.0 in terms of a molar equivalent with respect to element P, and more preferably, equal to or larger than 3.2 and equal to or smaller than 3.7.

As the phosphoric acid source, one, or two or more kinds of materials selected from the group consisting of phosphoric acid such as orthophosphoric acid (H$_3$PO$_4$) or metaphosphoric acid (HPO$_3$); ammonium dihydrogenphosphate (NH$_4$H$_2$PO$_4$); ammonium phosphate dibasic ((NH$_4$)$_2$HPO$_4$); ammonium phosphate ((NH$_4$)$_3$PO$_4$); and hydrides thereof are preferably used. Among them, orthophosphoric acid, ammonium dihydrogenphosphate, and ammonium phosphate dibasic are preferred since they have a relatively high purity and composition control thereof is easy.

Moreover, as examples of the solvent mainly composed of water, pure water, a water-alcohol solution, a water-ketone solution, a water-ether solution, and the like can be mentioned, and among them, pure water is preferred.

The reason is because water is cheap and the solvent properties such as solubility to each substance can be easily controlled by adjusting temperature and pressure.

<Second Step>

Subsequently, a Fe source and a reducing agent are mixed to the $Li_3PO_4$ slurry obtained in the first step to obtain a mixture (SP2 in FIG. 1).

As the Fe source, an Fe salt is preferred, and for example, one, or two or more kinds of materials selected from the group consisting of ferrous chloride (II) ($FeCl_2$), ferrous sulfate (II) ($FeSO_4$), ferrous formate (II) (($HCOO)_2Fe$), ferrous acetate (II) ($Fe(CH_3COO)_2$), ferrous citrate (II) ($Fe(C_6H_5O_7)^{1-}$), ferrous oxalate (II) (($COO)_2Fe_2$), and hydrides thereof are preferably used.

As the additive amount of the Fe salt, a molar equivalent of equal to or larger than 1.01 with respect to element P is preferred. Since the Fe salt first reacts with $Li_3PO_4$ to produce $Fe_3(PO_4)_2$, an excess of Fe is required. Although the upper limit can be appropriately adjusted in accordance with a concentration of reaction and an intended particle size, it is not possible to observe a change in particle size of the produced $LiFePO_4$ in the area of a molar equivalent of 1.5. This is supposed to be due to the saturated reaction rate. Therefore, the additive amount of the Fe salt is preferably equal to or larger than 1.01 and equal to smaller than 1.50 in terms of a molar equivalent with respect to element P, and more preferably, equal to or larger than 1.10 and equal to or smaller than 1.30.

Although the mixing ratio of the Li and Fe sources is not limited as long as no impurities are produced during the hydrothermal synthesis described later, the molar ratio of Li ions of the Li source to Fe ions of the Fe source is preferably equal to or larger than 1.5 and equal to or smaller than 4.5, and more preferably, equal to or larger than 2.0 and equal to or smaller than 4.0.

Here, if the molar fraction of Li ions is smaller than 1.5, the probability that the Li participating in the reaction will form counterions with negative ions included in the Fe source increases. As a result, there is a problem in that the reaction time increases, impurities are produced, and particles become coarse. On the other hand, if the molar fraction of Li ions is larger than 4.5, the reaction solution has a strong alkalinity. As a result, there is a problem in that impurities are easily produced. Therefore, the preferred molar ratio of Li ions to Fe ions is restricted to the above-mentioned range.

In the second step, instead of adding an excessive amount of Fe salt, a method of adding cationic species that form salts which are not easily soluble with regards to phosphoric acid and water is also possible. That is, this method involves adding the Fe salt in an amount equivalent to the theoretical composition of each element of $LiFePO_4$ and adding additional cationic species. This method can be divided into two methods in accordance with the added cationic species.

The first method adds alkali metal salts such as Na and K salts, alkali earth metal salts such as Ca and Mg salts, salts of rare earth elements, Al salts, ammonium salts, or a combination of two or more kinds thereof as the cationic species. The rare earth elements as used herein are the 15 elements La, Ce, Pr, Nd, Pm, Sm, Eu, Gd, Tb, Dy, Ho, Er, Tm, Yb, and Lu which are lanthanum series.

In this way, a salt formed by the cationic species consumes P-containing compounds in the reaction shown in Chemical Formula 2, and as a result, a Fe excess state in the reaction system can be achieved.

The second method substitutes the excessive amount of Fe salt with transition metal salts such as Mn, Ni, Cu, or Zn. That is, even when the excessive amount of Fe salt is substituted with these transition metal salts, the same effects can be obtained as in the case of adding the excessive amount of Fe salt.

These methods serve as an effective means for a case where different cationic species are introduced as dopants, and it is desired to obtain $LiFePO_4$ having a small particle size. In some cases, the above-mentioned elements are included in $LiFePO_4$ of a final product.

As the reducing agent, one, or two or more kinds of materials selected from the group consisting of sulfur dioxide ($SO_2$), sulfurous acid ($H_2SO_3$), sodium sulfite ($Na_2SO_3$), sodium bisulfite ($NaHSO_3$), ammonium sulfite (($NH_4)_2SO_3$), and phosphorous acid ($H_2PHO_3$) are preferably used.

<Third Step>

Subsequently, a reaction (hydrothermal synthesis) is carried out using the mixture obtained in the second step under high-temperature and high-pressure conditions to obtain a reactant including $LiFePO_4$ (SP3 in FIG. 1).

The high-temperature and high-pressure conditions are not particularly limited as long as the temperature, pressure, and time are within a range where $LiFePO_4$ is produced, and a reaction temperature is preferably equal to or higher than 120° C. and equal to or lower than 250° C., for example, and more preferably, equal to or higher than 150° C. and equal to or lower than 220° C. The reaction pressure is preferably equal to or higher than 0.2 MPa, for example, and more preferably, equal to or higher than 0.4 MPa. The reaction time depends on the reaction temperature, and is preferably equal to or longer than 1 hour and equal to or shorter than 24 hours, for example, and more preferably, equal to or longer than 3 hours and equal to shorter than 12 hours.

<Fourth Step>

Subsequently, the reactant including $LiFePO_4$ obtained in the third step is separated into $LiFePO_4$ and Li-containing waste solution (solution containing unreacted Li) by a generally known simple washing method such as decantation, centrifugal separation, or filtration (SP4-1 in FIG. 1).

The separated $LiFePO_4$ is dried for 3 hours or more at 40° C. or higher using a drier or the like, whereby $LiFePO_4$ particles having an average primary particle size of equal to or larger than 30 nm and equal to or smaller than 100 nm are obtained (SP4-2 in FIG. 1).

<Fifth Step>

A first alkali material is added to the Li-containing waste solution separated in the fourth step to remove impurities such as Fe and $PO_4$ components included in the waste solution (SP5 in FIG. 1). The removed impurities such as Fe and $PO_4$ components are disposed of as waste.

As the first alkali material, for example, one, or two or more kinds of materials selected from the group consisting of calcium oxide (CaO), calcium hydroxide ($Ca(OH)_2$), ammonia ($NH_3$), aqueous ammonia ($NH_4OH$), and amines are preferably used.

As the amines, methylamine, ethylamine, dimethylamine, diethylamine, trimethylamine, ethylenediamine, tetramethylenediamine, hexamethylenediamine, trimethyl ammonium, tetramethyl ammonium hydroxide, and the like are preferably used.

The Li-containing waste solution is purified by removing the impurities such as Fe and $PO_4$ components, and a Li-containing solution (impurities-removed solution) is obtained.

<Sixth Step>

Subsequently, phosphoric acid is added to the Li-containing solution to obtain a Li- and $PO_4$-containing solution (SP6 in FIG. 1).

As the additive amount of the phosphoric acid, it is preferable to add phosphoric acid in the same molar fraction as the phosphoric acid source in the first step. By adding phosphoric acid in the same molar fraction, it is possible to obtain $LiFePO_4$.

<Seventh Step>

Subsequently, a Li source is added to the Li- and $PO_4$-containing solution so that the molar ratio of Li to P is equal to or larger than 3.1 similarly to the first step, and an additional second alkali material is added. In this way, a solution containing lithium phosphate ($Li_3PO_4$) is produced (SP7 in FIG. 1).

As the second alkali material, a material which does not easily produce by-products during neutralization, that is, all the by-products are easily soluble in water, and which can be easily separated from lithium phosphate when washed with water is preferred. For example, one, or two or more kinds of materials selected from the group consisting of ammonium hydroxide (NaOH), potassium hydroxide (KOH), ammonia ($NH_3$), and aqueous ammonia ($NH_4OH$) are preferably used.

<Eighth Step>

Subsequently, the solution containing $Li_3PO_4$ is left in situ so that $Li_3PO_4$ settles down. Thereafter, this solution is washed using pure water and separated into $Li_3PO_4$ and a waste solution using filtration or the like (SP8 in FIG. 1).

<Ninth Step>

Subsequently, the $Li_3PO_4$ is diffused into pure water to obtain lithium phosphate ($Li_3PO_4$) slurry (SP9 in FIG. 1).

In this way, by repeatedly performing the first to ninth steps, it is possible to collect and recycle surplus Li discharged as a waste solution as $Li_3PO_4$ without disposing of it as waste. Moreover, it is possible to reduce costs associated with Li and obtain $LiFePO_4$ at low cost.

According to the method for producing a cathode active material for lithium ion batteries of the present invention, since a hydrothermal reaction is carried out by adding elements Li and Fe in Li and Fe salts, which are used as raw materials, in amounts excessively larger than the theoretical amounts required for the hydrothermal reaction, Li and Fe will not become deficient in each reaction of the $LiFePO_4$ synthesis. Therefore, a slowdown in reaction rate and epitaxial growth on fine crystal particles produced in the initial stage of a reaction can be suppressed. Accordingly, it is possible to reduce an average primary particle size and synthesize $LiFePO_4$ having a small particle size with a uniform particle size distribution. Further, by changing the proportion of the added Li and Fe salts in the raw materials, it is possible to control the particle size of $LiFePO_4$.

The average primary particle size of the $LiFePO_4$ is equal to or larger than 30 nm and equal to or smaller than 100 nm. By using the $LiFePO_4$ having a small particle size as the cathode active material for lithium ion batteries, a diffusion distance of Li decreases. Moreover, the quick charge and discharge properties in a lithium ion battery electrode and a lithium ion battery having the cathode active material for lithium ion batteries can be improved.

Here, if the average primary particle size is less than 30 nm, there is a fear of destruction of particles due to a structural change accompanied by absorption/desorption of Li. Moreover, since the specific surface area increases greatly, a lot of joining materials will be required. As a result, there is a fear of causing a problem in that a packing density of the cathode decreases greatly, and conductivity decreases greatly. On the other hand, if the average primary particle size exceeds 100 nm, an internal resistance of the cathode active material increases, and the mobility of Li ions decreases also. Therefore, there is a fear of causing a problem in that the discharge capacity decreases.

To realize higher output power, particles having a particle size of 80 nm or smaller which have less influence on the internal resistance of the cathode active material are preferred.

(Cathode Active Material for Lithium Ion Batteries, Lithium Ion Battery Electrode, and Lithium Ion Battery)

The cathode active material for lithium ion batteries obtained by the production method of the present invention is suitably used as the cathode active material in a lithium ion battery, particularly in a lithium ion secondary battery. By using as the cathode active material of a lithium ion secondary battery, it is possible to decrease the diffusion distance of Li and increase the discharge capacity as described above.

When used as the cathode active material, it is preferable to increase the conductivity by a method of coating the surface of $LiFePO_4$ with a carbon component. Unless this treatment is performed, it is not possible to improve the conductivity which is the problem of $LiFePO_4$ and obtain favorable results as battery properties.

As a preferred example of carbon coating, $LiFePO_4$ particles are mixed with water-soluble monosaccharides and polysaccharides or water-soluble polymer compounds, and the particle surfaces are uniformly coated with organic materials using a drying method such as an evaporation-to-dryness method, a vacuum drying method, a spray drying method, or a freeze drying method (preparation of composite). Subsequently, a resulting material is baked in an inert atmosphere at a baking temperature of lower than 500° C. and higher than 1000° C. which is the temperature at which organic materials are decomposed, and carbon is produced.

The baking temperature depends on the organic materials of a selected carbon source and is preferably in the range of 700° C. to 800° C. At low temperatures of equal to or lower than 500° C., the decomposition of organic materials is not sufficient, and the composition of conductive carbon is not sufficient, which serve as the increasing factor of the internal resistance of a battery and have an adverse effect. On the other hand, at high temperatures of equal to or higher than 1000° C., the sintering of primary particles of $LiFePO_4$ is accelerated, and particles become coarse. As a result, the quick charge and discharge properties which depend on the diffusion rate of Li are deteriorated greatly.

EXAMPLES

Hereinafter, a specific example of the present invention will be described by way of Experimental Examples. However, the present invention is not limited to this. Among Experimental Examples 1 to 14, Experimental Examples 1 to 3 are comparative examples, and Experimental Examples 4 to 14 are examples of the present invention.

Experimental Example 1

3 mol of lithium chloride (LiCl) and 1 mol of phosphoric acid ($H_3PO_4$) were added to 1 L of pure water and stirred to obtain lithium phosphate ($Li_3PO_4$) slurry. Moreover, to this slurry, 1 mol of ferrous chloride (II) ($FeCl_2$) was added, and in addition, water was added to obtain a raw material solution having a total amount of 2 L. This raw material solution has a concentration of 0.5 mol/L when converted in terms of $LiFePO_4$.

Subsequently, the obtained raw material solution was loaded into an autoclave, and after inert gas was introduced therein, the raw material solution was subjected to a heating reaction for 6 hours at 200° C. Thereafter, the raw material solution was filtrated to separate solids and liquids. After that, washing was carried out by performing an operation of adding water in the same amount as the weight of the separated solid so as to suspend the solid and separating solids and liquids through filtration for three times.

The $LiFePO_4$ obtained by solid-liquid separation was dried, and the particle size of $LiFePO_4$ was measured by FE-SEM. The measured average primary particle size was equal to or larger than 30 nm and equal to or smaller than 100 nm.

Subsequently, 5 g of polyethylene glycol and 150 g of pure water were added to cake-shaped $LiFePO_4$ (150 g in terms of solid content) obtained by solid-liquid separation, and grinding and diffusion processing was carried out for 12 hours by ball milling using zirconia beads having a diameter of 5 mmΦ, whereby uniform slurry was prepared.

Subsequently, this slurry was sprayed in the heated atmosphere of 180° C. and dried, and an assembly having an average particle size of about 6 μm was obtained. The obtained assembly was baked for 1 hour at 750° C. under an inert atmosphere, whereby a cathode active material for lithium ion batteries of Experimental Example 1 was obtained.

Experimental Example 2

A cathode active material of Experimental Example 2 was produced in accordance with the procedure of Experimental Example 1, except that an excess of 0.01 mol of $FeCl_2$ to element P was added during the initiation of the autoclave reaction.

Experimental Example 3

A cathode active material of Experimental Example 3 was produced in accordance with the procedure of Experimental Example 1, except that 3.50 mol of LiCl to element P was added during the initiation of the autoclave reaction.

Experimental Example 4

A cathode active material of Experimental Example 4 was produced in accordance with the procedure of Experimental Example 1, except that 3.10 mol of LiCl to element P and an excess of 0.01 mol of $FeCl_2$ to element P was added during the initiation of the autoclave reaction.

Experimental Example 5

A cathode active material of Experimental Example 5 was produced in accordance with the procedure of Experimental Example 1, except that 3.25 mol of LiCl to element P and an excess of 0.01 mol of $FeCl_2$ to element P was added during the initiation of the autoclave reaction.

Experimental Example 6

A cathode active material of Experimental Example 6 was produced in accordance with the procedure of Experimental Example 1, except that 3.50 mol of LiCl to element P and an excess of 0.01 mol of $FeCl_2$ to element P was added during the initiation of the autoclave reaction.

Experimental Example 7

A cathode active material of Experimental Example 7 was produced in accordance with the procedure of Experimental Example 1, except that 4.00 mol of LiCl to element P and an excess of 0.01 mol of $FeCl_2$ to element P was added during the initiation of the autoclave reaction.

Experimental Example 8

A cathode active material of Experimental Example 8 was produced in accordance with the procedure of Experimental Example 1, except that 4.50 mol of LiCl to element P and an excess of 0.01 mol of $FeCl_2$ to element P was added during the initiation of the autoclave reaction.

Experimental Example 9

A cathode active material of Experimental Example 9 was produced in accordance with the procedure of Experimental Example 1, except that 3.25 mol of $Li_2SO_4$ to element P and an excess of 0.01 mol of $FeCl_2$ to element P was added during the initiation of the autoclave reaction.

Experimental Example 10

A cathode active material of Experimental Example 10 was produced in accordance with the procedure of Experimental Example 1, except that 3.25 mol of $CH_3COOLi$ to element P and an excess of 0.01 mol of $FeCl_2$ to element P was added during the initiation of the autoclave reaction.

Experimental Example 11

A cathode active material of Experimental Example 11 was produced in accordance with the procedure of Experimental Example 1, except that 3.10 mol of LiCl to element P and an excess of 0.10 mol of $FeCl_2$ to element P was added during the initiation of the autoclave reaction.

Experimental Example 12

A cathode active material of Experimental Example 12 was produced in accordance with the procedure of Experimental Example 1, except that 3.10 mol of LiCl to element P and an excess of 0.25 mol of $FeCl_2$ to element P was added during the initiation of the autoclave reaction.

Experimental Example 13

A cathode active material of Experimental Example 13 was produced in accordance with the procedure of Experimental Example 1, except that 3.10 mol of LiCl to element P and an excess of 0.50 mol of $FeCl_2$ to element P was added during the initiation of the autoclave reaction.

Experimental Example 14

A cathode active material of Experimental Example 14 was produced in accordance with the procedure of Experimental Example 1, except that 3.10 mol of LiCl to element P and an excess of 1.00 mol of $FeCl_2$ to element P was added during the initiation of the autoclave reaction.

(Production of Lithium Ion Secondary Battery)

90 wt % of the produced cathode active materials of Experimental Examples 1 to 14, 5 wt % of acetylene black as an auxiliary conductive agent, 5 wt % of polyvinylidene difluoride (PVDF) as a binder, and N-methyl-2-pyrrolidone (NMP) as a solvent were mixed. Thereafter, these materials were subjected to kneading using a three roll mill, whereby 14 kinds of cathode active material pastes of Experimental Examples 1 to 14 were obtained.

Subsequently, the obtained respective cathode active material pastes were applied onto an aluminum collector foil having a thickness of 30 μm and subjected to reduced-pressure drying at 100° C., whereby cathodes having a thickness of 50 μm were obtained.

Subsequently, the cathodes were punched into a circular disk form having a size of 2 cm² and subjected to reduced-pressure drying. After that, lithium ion secondary batteries were produced under a dried argon atmosphere using a 2016-type coin cell made of stainless steel.

Here, lithium metal was used as an anode, a porous polypropylene film was used as a separator, and a 1 M solution, in which ethylene carbonate (EC) of $LiPF_6$ and ethyl methyl carbonate (EMC) were mixed in the ratio of 1:1, was used as an electrolytic solution.

(Battery Charge and Discharge Test)

Charge and discharge tests were conducted using lithium ion batteries having the produced cathode active materials of Experimental Examples 1 to 14.

During the charge and discharge tests, a cut-off voltage was in the range of 2.0 V to 4.0 V. In the initial capacity measurement, the batteries were charged at 0.1 C in terms of C rate and discharged at 0.1 C. In the performance evaluation at other rates, the batteries were charged at 0.2 C and discharged at an arbitrary rate (1 C, 3 C, and 5 C), and the discharge capacities thereof were measured. The results are shown in Table 1.

(Evaluation of Primary Particle Size)

Figure 2:
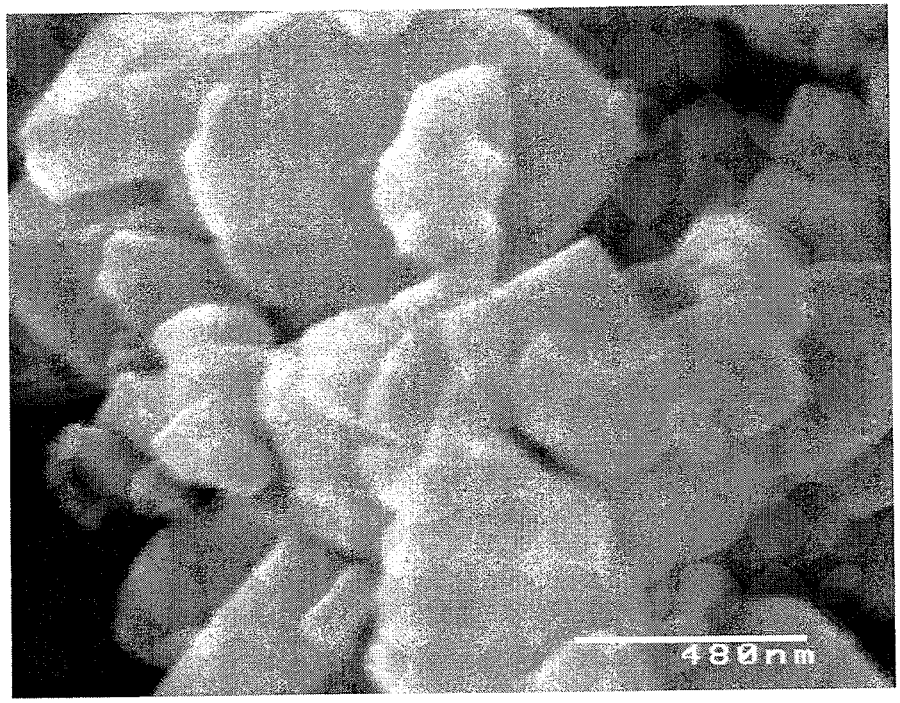
FIG. 2 is a SEM image of a cathode active material for lithium ion batteries of Experimental Example 1.
Figure 3:
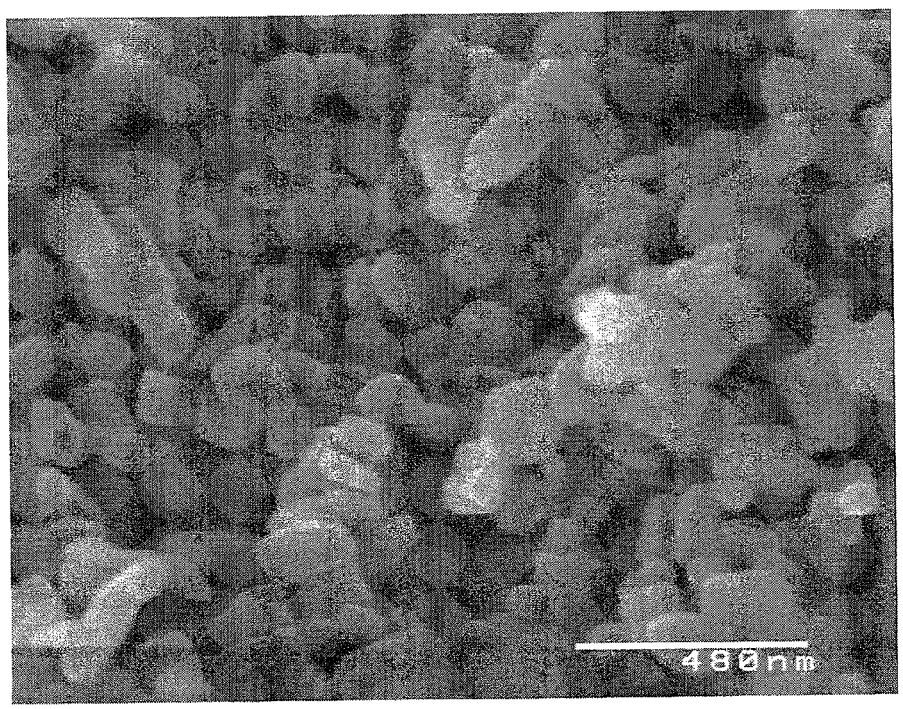
FIG. 3 is a SEM image of a cathode active material for lithium ion batteries of Experimental Example 5.
Figure 4:
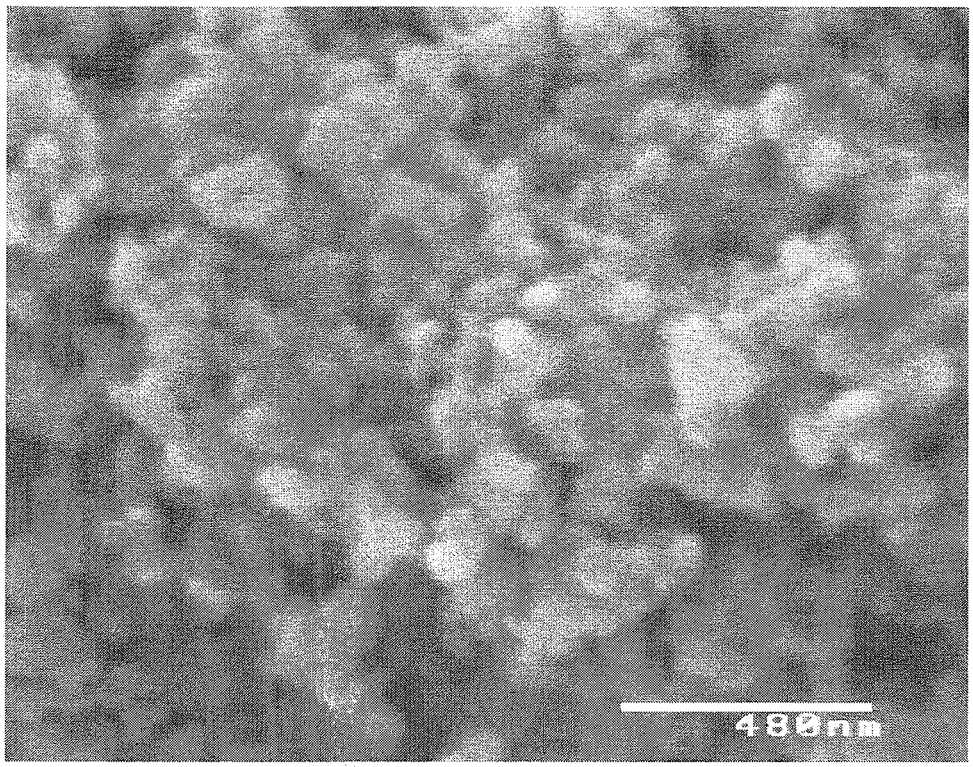
FIG. 4 is a SEM image of a cathode active material for lithium ion batteries of Experimental Example 6.

The average at 20 points extracted randomly from 50000-fold FE-SEM images was calculated. The results are shown in Table 1. Moreover, the SEM images of the cathode active materials for lithium ion batteries of Experimental Examples 1, 5, and 6 are shown in FIGS. 2 to 4.

mary particle size of the cathode active material can be controlled in the range of 30 nm to 100 nm.

Moreover, as understood from Table 1, in the lithium ion batteries having the cathode active materials for lithium ion batteries of Experimental Examples 4 to 14, although the specific surface areas thereof increased compared to the lithium ion batteries having the cathode active materials for lithium ion batteries of Experimental Examples 1 to 3, when the batteries were charged at 0.2 C and discharged at 1 C, 3 C, and 5 C, the discharge capacities thereof were increased, and improvements in the charge and discharge properties were observed.

INDUSTRIAL APPLICABILITY

By applying the cathode active material for lithium ion batteries obtained by the production method of the cathode active material for lithium ion batteries of the present invention to electrode materials of lithium ion secondary batteries or the like, it is possible to achieve an improvement in the discharge capacity.

The invention claimed is:

1. A method for producing a cathode active material for lithium ion batteries, comprising: at least a step of carrying out a hydrothermal reaction to produce $LiFePO_4$ by adding elements Li and Fe in Li and Fe salts, which are used as raw materials, in amounts excessively larger than the theoretical amounts required for the hydrothermal reaction, thus synthesizing $LiFePO_4$ which has an average primary particle size of equal to or larger than 30 nm and equal to or smaller than 100 nm,

TABLE 1

| | Li Source | Initial Element Ratio | | | Primary Particle Size (nm) | Specific Surface Area (m²/g) | Discharge Capacity (mAh/g) | | | |
| | | Li | Fe | P | | | 0.1 C/0.1 C | 0.2 C/1 C | 0.2 C/3 C | 0.2 C/5 C |
|---|---|---|---|---|---|---|---|---|---|---|
| Experimental Example 1 | LiCl | 3.00 | 1.00 | 1.00 | 500 | 4 | 160 | 135 | 105 | 80 |
| Experimental Example 2 | LiCl | 3.00 | 1.01 | 1.00 | 400 | 5 | 159 | 135 | 100 | 89 |
| Experimental Example 3 | LiCl | 3.50 | 1.00 | 1.00 | 350 | 6 | 159 | 135 | 103 | 84 |
| Experimental Example 4 | LiCl | 3.10 | 1.01 | 1.00 | 100 | 13 | 158 | 142 | 122 | 100 |
| Experimental Example 5 | LiCl | 3.25 | 1.01 | 1.00 | 70 | 16 | 155 | 144 | 132 | 112 |
| Experimental Example 6 | LiCl | 3.50 | 1.01 | 1.00 | 50 | 18 | 150 | 146 | 140 | 120 |
| Experimental Example 7 | LiCl | 4.00 | 1.01 | 1.00 | 30 | 27 | 148 | 145 | 139 | 118 |
| Experimental Example 8 | LiCl | 4.50 | 1.01 | 1.00 | 30 | 28 | 147 | 144 | 138 | 119 |
| Experimental Example 9 | $Li_2SO_4$ | 3.25 | 1.01 | 1.00 | 50 | 21 | 152 | 145 | 135 | 113 |
| Experimental Example 10 | $CH_3COOLi$ | 3.25 | 1.01 | 1.00 | 50 | 18 | 151 | 140 | 130 | 111 |
| Experimental Example 11 | LiCl | 3.10 | 1.10 | 1.00 | 70 | 17 | 152 | 143 | 130 | 115 |
| Experimental Example 12 | LiCl | 3.10 | 1.25 | 1.00 | 50 | 21 | 151 | 142 | 131 | 119 |
| Experimental Example 13 | LiCl | 3.10 | 1.50 | 1.00 | 30 | 26 | 147 | 142 | 135 | 120 |
| Experimental Example 14 | LiCl | 3.10 | 2.00 | 1.00 | 30 | 26 | 145 | 142 | 130 | 121 |

From the results of Table 1 and FIGS. 2 to 4, it was confirmed that by carrying out a reaction by adding the Li and Fe salts in amounts larger than the theoretical compositions of $LiFePO_4$ shown in Experimental Example 1, the average priwherein the Fe salt is added so that the molar ratio of Fe to P is within the range of 1.01 to 2.00, and the Li salt is added so that the molar ratio of Li to P is within the range of 3.1 to 4.50.

2. The method for producing a cathode active material for lithium ion batteries according to claim 1, wherein the Li salt is one, or two or more kinds of materials selected from the group consisting of chloride, sulfate, formate, acetate, citrate, and oxalate.

3. The method for producing a cathode active material for lithium ion batteries according to claim 1, wherein the Fe salt is one, or two or more kinds of materials selected from the group consisting of chloride, sulfate, formate, acetate, citrate, and oxalate.

* * * * *